March 5, 1963 J. KRYNSKI ET AL 3,080,063
FILTER
Filed July 15, 1959 3 Sheets-Sheet 1
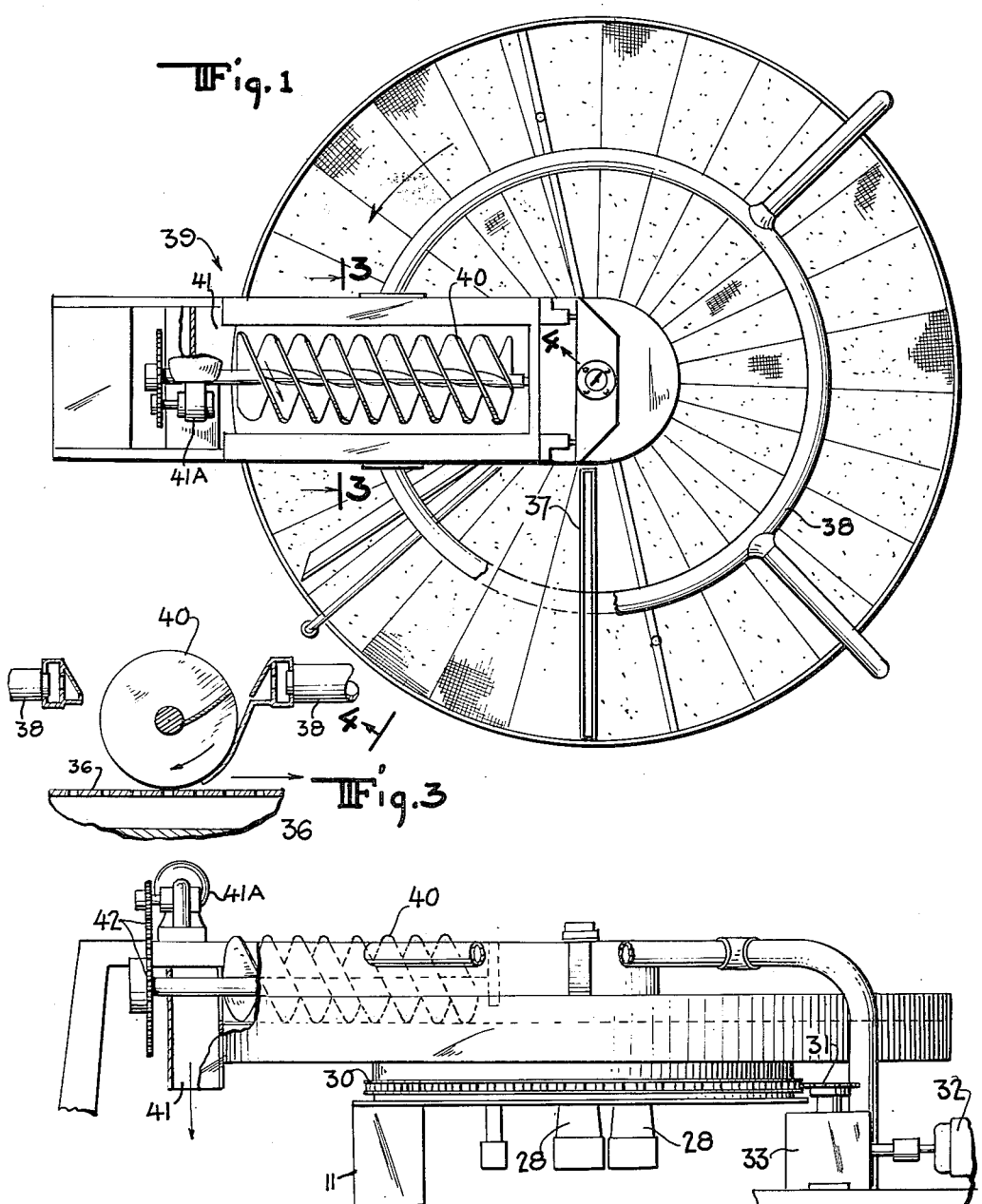

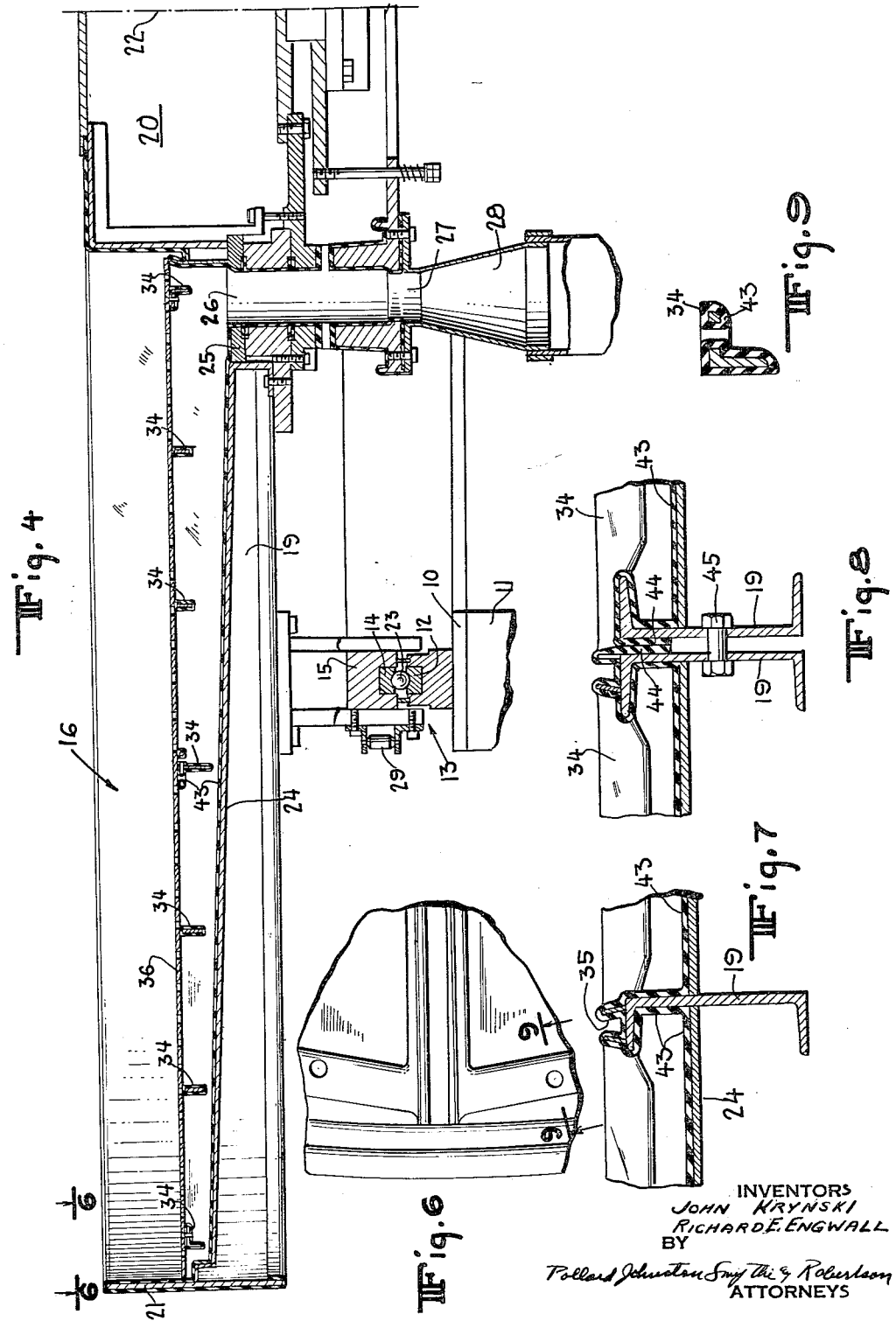

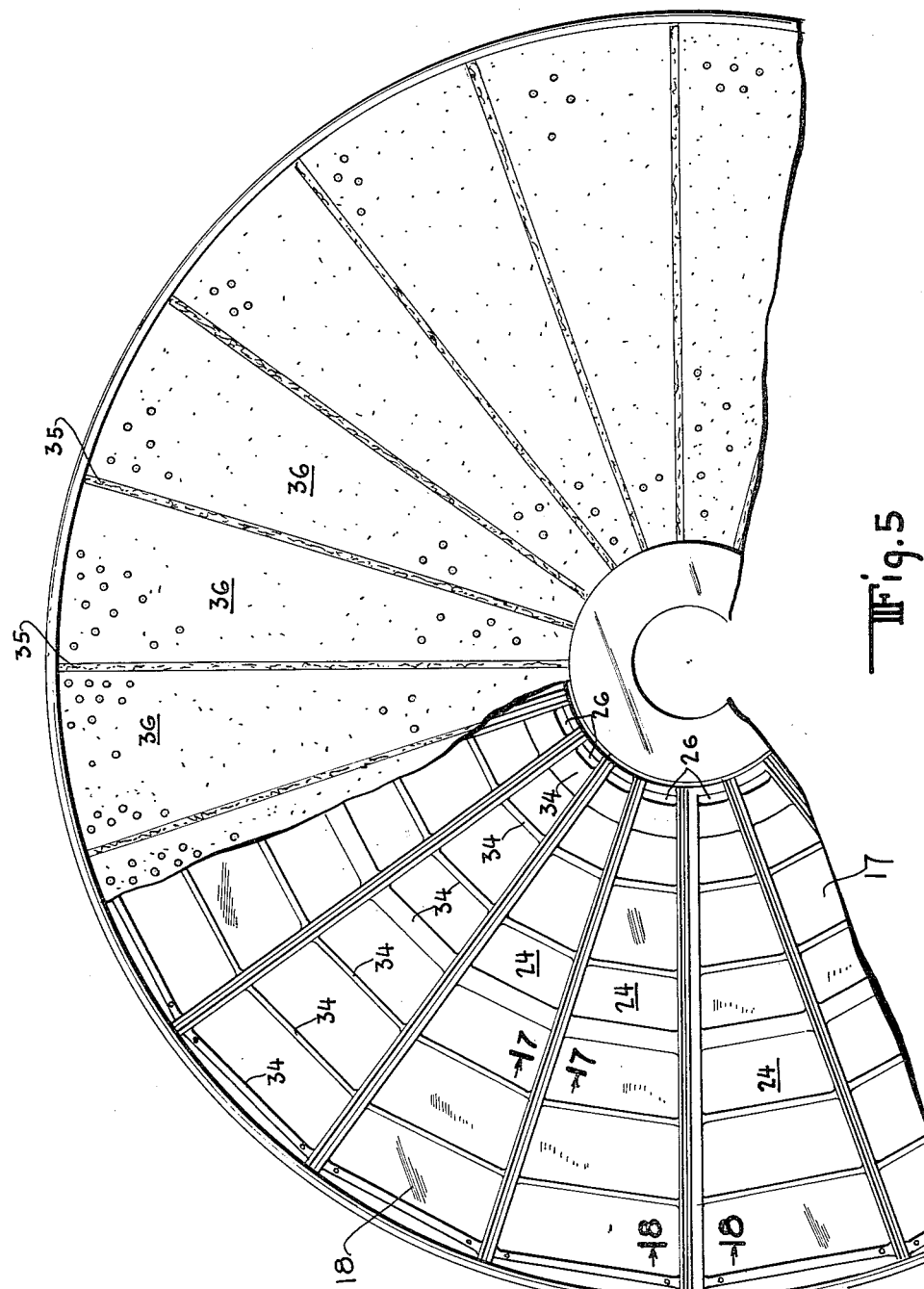

United States Patent Office 3,080,063
Patented Mar. 5, 1963

3,080,063
FILTER
John Krynski and Richard E. Engwall, East Moline, Ill., assignors to Ametek, Inc., New York, N.Y., a corporation of Delaware
Filed July 15, 1959, Ser. No. 827,316
2 Claims. (Cl. 210—330)

The present invention relates to improvements in horizontal pan-type filtering machines, and particularly to an improved corrosion-resistant construction of the filtering pan.

Filtering machines of the above described type are usually of relatively large proportions and may include sectionalized pan elements, each containing a plurality of individual pans for supporting the sludge to be filtered. In many filtering processes, the filtrate may be extremely corrosive, causing considerable damage to the pan construction as well as to other components which come in contact with the filtrate.

The principal object of the invention is to provide a horizontal pan-type of filtering machine that will be resistant to corrosive filtrates.

Another object of the invention is to provide such a filtering machine in which the horizontal pan is made up of two semicircular sections, each having a plurality of individual compartments, and in which the pan surfaces subjected to the filtrate are protected from corrosion by a corrosion-resistant layer of material that is effective throughout the pan surfaces as well as at the joints between the two semicircular sections.

Another object of this invention is to provide such a filtering machine in which the individual compartments of each section are protected from corrosion by a continuous layer of corrosion-resistant material that covers all of the compartment surfaces as well as separating rib surfaces between the various compartments.

Another object of this invention is to provide a horizontal pan-type of filtering machine in which radiating caulking grooves are provided between successive compartments for caulking into them edges of individual sludge-supporting screens for each compartment, and in which the caulking grooves are completely covered with a corrosion-resistant material.

In one aspect of the invention, a horizontal pan-type filtering machine may include a sectionalized pan device which may include a plurality of separate sections in each of which may be located a plurality of individual pans. The separate sections may include radially disposed ribs that define the individual pans, and the ribs at the dividing line of successive sections may be bolted together to form a circular pan adapted to be revolved in a horizontal plane.

In another aspect of the invention, radially disposed caulking grooves may be integrally attached to the top of the radial ribs, and separate screen sections may be laid over each separate pan compartment in a manner to be supported by concentrically arranged series of ribs in each pan compartment with their edges overlying the caulking grooves between successive pan compartments.

In another aspect of the invention, a relatively thick, corrosion-resistant layer of material may be bonded to the interior surfaces of the pan compartments as well as to the exposed surfaces of the dividing ribs, the caulking ribs and the section joining ribs of the pan assembly. This layer of corrosion-resistant material may be sheet rubber, polyethylene sheet, or it may be flame-sprayed polyethylene similar to the well known metallizing process.

The above, other objects and novel features of the invention will become apparent from the following specification and accompanying drawings which are merely exemplary.

In the drawings:

FIG. 1 is a top plan view of a horizontal pan-type of filtering machine to which the principles of the invention have been applied;

FIG. 2 is a side elevational view of the apparatus shown in FIG. 1;

FIG. 3 is a sectional elevational view taken substantially along line 3—3 of FIG. 2;

FIG. 4 is a sectional elevational view taken substantially along line 4—4 of FIG. 1;

FIG. 5 is an enlarged plan view of part of the horizontal pan shown in FIG. 1, with a portion of the sludge-supporting screen broken away;

FIG. 6 is a plan view looking along line 6—6 of FIG. 4;

FIG. 7 is a sectional elevational view taken substantially along line 7—7 of FIG. 5;

FIG. 8 is a sectional elevational view taken substantially along line 8—8 of FIG. 5; and FIG. 9 is a sectional elevational view taken substantially along line 9—9 of FIG. 6.

Referring to FIGS. 1 to 4, inclusive, the principles of the invention are shown as applied to a horizontal pan-type of filtering machine including a base 10 mounted on a raised foundation 11. The base 10 may support the lower race 12 of an anti-friction bearing 13, the upper race 14 of which may be fixed to pendant blocks 15.

A horizontally disposed pan 16 may comprise a plurality of segments and in the embodiment disclosed, two segments 17 and 18 (FIG. 5) are shown. The segments 17 and 18 may comprise channel members 19 radiating from a central island 20, and the outer ends of said channel members 19 may be joined to a peripherally disposed plate 21 forming semi-circular segments.

The channel members 19 may be fixed to the top of blocks 15 so that the assembled pan may rotate about a vertical axis 22 on the anti-friction balls 23 of bearing 13. Between adjacent channel members 19, a sheet metal plate 24 of generally "pie-shaped" may be welded or otherwise integrally joined to the webs of adjacent channel members 19. These plates 24 are inclined downwardly from the peripheral plate 21 toward the island 20, terminating at, and joined to the periphery of a distributor plate 25 to which the outer periphery of the island 20 is attached. Orifices 26 may be provided about the plate 25, one for each pan compartment, and they may be in communication with kidney-shaped orifices 27 within a series of stationary exhaust or filter valves 28 mounted within the circle defined by the foundation 11.

Driving means may be provided for the rotatable pan and it may include a series of rolls 29 arranged peripherally about the blocks 15 in a manner to provide a sprocket 30. Referring to FIG. 2, the sprocket 30 may mesh with a sprocket wheel or gear 31 that is adapted to be rotated by a motor 32 through a gear reduction unit 33.

Referring to FIGS. 4 and 5, ribs 34 may extend between adjacent channel members 19 and they may be fixed to said members 19 in a manner to provide a clearance between them and the plates 24 forming the bottoms of the pan compartments.

Referring to FIG. 7, radially extending, channel-shaped caulking groove members 35 may be rigidly attached to the tops of the members 19, and the top of said members 35 may be at the same elevation as that of the ribs 34. Referring to FIG. 4, individual "pie-shaped" screen members 36 may be supported by the ribs 34 of each pan compartment, and the edges of the screen members 36 may lie across the caulking groove members 35. These edges may be forced into the caulking grooves and held therein by caulking material.

Referring to FIG. 1, a sludge or slurry feeding device 37 may be located above the pan so as to feed slurry to be filtered evenly over the radial dimension of the horizontal pan. A washing liquid distributing means 38 may be located over the pan in a manner to feed wash liquid to the slurry as the table is continuously rotated at a relatively slow speed in the direction of the arrow (FIG. 1). Suction may be applied to the filter valves 28 for sucking the filtrate through the screen 36. The filtrate gravitates down the sloping surface of the plates 24 toward the valves 28 from which the filtrate is conducted to various separation receivers (not shown).

During the process, a residue cake develops on the screen 36 which is fed to a cake-removing device 39 (FIG. 1). The device 39 may include a spiral conveyor 40 that scrapes the filter cake from the screen 36 and feeds it through an exit pipe 41 (FIG. 2). The spiral conveyor 40 may be driven by a motor 41A through gearing 42 in a well known manner.

Referring to FIG. 7, the interior surfaces of the pan compartments may be provided wtih a corrosion-resistant, relatively thick layer of material 43. This layer may extend along the bottom of the pan compartment formed by the plate 24, the side walls of the compartment formed by adjacent channel members 19, around the top leg of the member, thence over the exposed surfaces of the caulking groove member 35, thence over the corresponding surfaces within adjacent compartments. The layer of material 43 may be continuous throughout all of the compartments of a pan segment, terminating in end portions 44 on the outside of the members 19 forming the parting line between adjacent pan segments.

Adjacent pan segments may abut each other along terminating members 19 of each segment and bolts 45 may be employed to rigidly fasten adjacent pan segments together in a manner to compress the terminating layers 44 of the corrosion-resistant material 43. In addition, all of the bars 34 may be encased in the material 43 as well as the inner and exterior surfaces of the peripheral plate 21.

The layer of material throughout the pan compartments of each segment may be continuous and may be made of rubber which may be vulcanized to the metal surfaces it covers, by introducing a pan segment into a steam pressure vessel that will apply sufficient heat and pressure to effect the vulcanizing action.

Alternatively, the layer 43 may be provided by flame spraying polyethylene onto the metal surfaces to be protected in a manner similar to the well known method of metallizing parts. Furthermore, the layer 43 may be a sheet of polyethylene, and the joints may be heat sealed in a known manner.

It is important, of course, that the corrosion-resistant layer adhere tightly to the metal which it is intended to protect.

Although the various features of the improved corrosion-resistant, horizontal pan-type of filter have been shown and described to fully disclose one embodiment of the invention, it will be evident that numerous changes may be made in such details and certain features may be used without others without departing from the principles of the invention.

What is claimed is:

1. In a horizontal filter having a rotatable pan assembly composed of a plurality of segments, each of said segments including a plurality of individual pan compartments, means for feeding fluid to be filtered, means to withdraw filtrate from each compartment, each of said segments terminating in channel ribs having vertical surfaces, channel members providing radial ribs in said segments which together with said channel ribs define said compartments, dovetail shaped caulking groove members on each of said ribs, a corrosion-resistant coating of flexible material for each segment covering the surfaces of said pan compartments as well as the surfaces of said ribs and caulking groove members that would otherwise be subject to contact by the filtrate, the coating of each segment terminating on the vertical surface of each terminal channel rib, means for rigidly fastening adjacent segments together and for compressing the terminal portions of each coating along a parting line between said vertical surfaces, segmentally shaped screen members each overlying a corresponding individual pan compartment and portions of adjacent ribs and caulking groove members with their edges held within the coated dovetail shaped grooves of said caulking members, and caulking material for holding said screen edges in said coated dovetail shaped grooves.

2. In a horizontal filter having a rotatable pan assembly composed of a plurality of segments, each of said segments including a plurality of segregated pan compartments, means for feeding fluid to be filtered, means to withdraw filtrate from each compartment, each of said segments terminating in channel ribs having vertical surfaces, channel members providing radial ribs in said segments which together with said channel ribs define said compartments, dovetail shaped caulking groove members on each of said ribs, a corrosion-resistant coating of flexible material for each segment bonded to the surfaces of said pan compartments as well as the surfaces of said ribs and caulking groove members that would otherwise be subject to contact by the filtrate, the coating of each segment terminating on the vertical surface of each terminal channel rib, means for rigidly fastening adjacent segments together and for compressing the terminal portions of each coating along a parting line between said vertical surfaces, segmentally shaped screen members each overlying a corresponding segregated pan compartment and portions of adjacent ribs and caulking groove members with their edges held within the coated dovetail shaped grooves of said caulking members, and caulking material for holding said screen edges in said coated dovetail shaped grooves.

References Cited in the file of this patent

UNITED STATES PATENTS

| 627,293 | Brighton | June 20, 1899 |
|---|---|---|
| 882,202 | Hunt | Mar. 17, 1908 |
| 1,440,109 | Schenck | Dec. 26, 1922 |
| 2,100,895 | Austin | Nov. 30, 1937 |
| 2,588,912 | Denhard | Mar. 11, 1952 |

FOREIGN PATENTS

| 894,668 | France | Mar. 20, 1944 |